Jan. 13, 1959   H. B. SEDGFIELD ET AL   2,868,021
GYROSCOPIC APPARATUS
Filed July 15, 1954   3 Sheets-Sheet 2

INVENTORS
HUGH BROUGHAM SEDGFIELD
WILLIAM FISHER LUTTRELLE
BY
Herbert H. Thompson
ATTORNEY Jan. 13, 1959     H. B. SEDGFIELD ET AL     2,868,021
GYROSCOPIC APPARATUS Filed July 15, 1954     3 Sheets-Sheet 3

INVENTORS
HUGH BROUGHAM SEDGFIELD
WILLIAM FISHER LUTTRELLE
BY
ATTORNEY

United States Patent Office 2,868,021
Patented Jan. 13, 1959

2,868,021
GYROSCOPIC APPARATUS

Hugh Brougham Sedgfield, Hampton, and William Fisher Luttrelle, Holyport, England, assignors to The Sperry Gyroscope Company Limited, Brentford, England, a British company Application July 15, 1954, Serial No. 443,578
Claims priority, application Great Britain July 17, 1953
6 Claims. (Cl. 74—5.4)

This invention relates to gyroscopic apparatus of the kind in which a gyroscope rotor is mounted for spinning about a spin axis in a rotor case which is supported for rotation about a first gimbal axis perpendicular to the spin axis of the gyroscope rotor in a gimbal frame which is itself mounted in a support for rotation about a second gimbal axis perpendicular to both the spin axis and the first gimbal axis, in which means are provided for controlling the support to cause a reference line in it to be maintained parallel to the spin axis of the gyroscope rotor, and in which means are provided for applying precessional torques to the rotor case. Gyroscopic apparatus of this kind will hereinafter be referred to as gyroscopic apparatus of the kind specified.

The support in which the gimbal frame is mounted may be fixed in a platform which is itself mounted in a mobile craft with freedom of relative angular movement about three mutually perpendicular axes. Such an arrangement may be used, for instance, in a gyroscopic system for defining a vertical reference on a travelling craft and the platform is then controlled by a servo system so that a reference line in it is maintained in alignment with the vertical defined by the gyroscopic system.

Alternatively the support may be fixed in a mobile craft, and the craft itself may be controlled so that the reference line in the support is maintained parallel to the spin axis of the gyroscope rotor.

In known gyroscopic apparatus of the kind specified it has been usual to apply the precessional torques to the rotor case about the gimbal axes. For this purpose in the construction of gyroscopic apparatus commonly adopted, one torque-applying device is mounted on the support to apply a torque to the gimbal frame about the second gimbal axis and a further torque-applying device is mounted on the gimbal frame to apply a torque to the rotor case about the first gimbal axis. When this construction is adopted, the torques applied are necessarily about the gimbal axes, and moreover, the devices are necessarily themselves located on the gimbal axes, although each device is not necessarily located on the axis about which it applies a torque.

Torque-applying devices of two principal kinds have been employed. A torque-applying device of the first kind is a true torque motor in that it operates to apply a torque about the axis on which it is mounted, while a torque-applying device of the second kind operates to provide a force normal to and at some distance from the axis about which the torque is required to be applied. Torque-applying devices of either kind comprise two parts, each mounted on one of the two elements between which the torque is to be produced. Thus in the case of torque-applying devices of the first kind, each device must be mounted coaxially with one of the gimbal bearings, and normally as a matter of construction must be displaced axially from that bearing. Similarly, in the case of a torque-applying device of the second kind, the part of each torque-applying device that is mounted on the gimbal frame, must be coaxial with one of the bearings in the gimbal frame, and again as a matter of construction must normally be axially displaced from this bearing.

The object of the present invention is to provide gyroscopic apparatus which may be constructed in such a way that, with a rotor of given dimensions, the overall size of the apparatus may be less than that of known forms of apparatus.

In the particular application for which the present gyroscopic apparatus was designed, the outer support is fixed directly in a craft or missile and alignment is maintained between the support and the rotor case by steering the craft to reduce to zero signals measuring any departure from a predetermined relationship between the support and the rotor case. These signals operate the control surfaces or other steering means, of the craft through servo systems of a kind known per se. As the craft is controlled so that it always has a known relationship to the rotor case, the direction of flight of the craft is determined by the direction of the spin axis of the rotor. Hence, control of the direction of flight of the craft may be effected by the application of precessional torques to the rotor case, by means of the torque motors. It is envisaged that it may be necessary to cause the direction of flight of the craft to change at high angular rates and hence it must be possible for the rotor to be precessed at similar high rates. For this reason large and efficient torque motors are required. An object of the present invention is to facilitate the provision of such large torque motors without any undue increase in the size of the apparatus.

Accordingly the invention consists in gyroscopic apparatus of the kind specified in which the torque-applying means comprises a plurality of torque-applying devices each of which operates, when energised, to apply a force directly between the support and the rotor case to produce a torque on the rotor case about an axis lying in the plane containing the first and second gimbal axes and displaced at an angle to each of those axes. Preferably the axes about which the precessional torques are produced are displaced at an angle of 45° to each of the first and second gimbal axes. In a convenient form of construction each torque-applying device is located on a radius from the centre of the gyroscope rotor that lies between and in the same plane as the gimbal axes, and each torque-applying device operates to provide a torque about an axis normal to the radius on which it is located.

One embodiment of gyroscopic apparatus according to the invention for steering an aircraft or missile will now be described with reference to the accompanying drawings in which.

Figure 1:
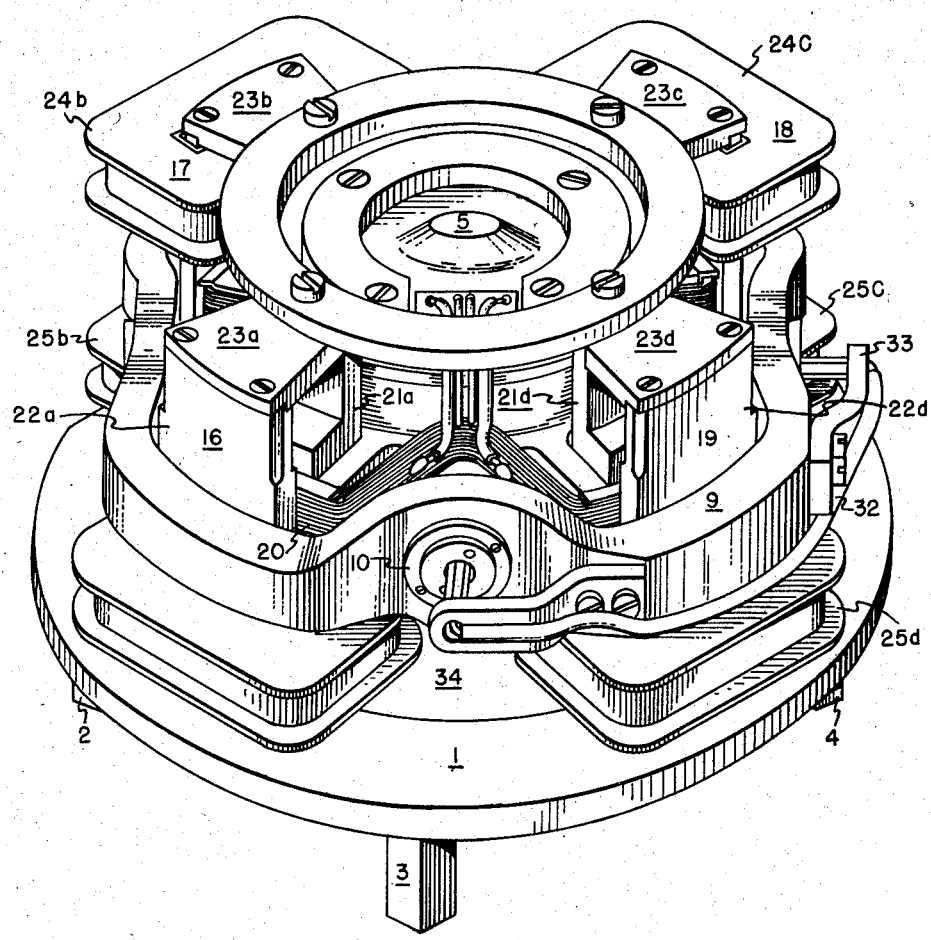
Fig. 1 shows an overall view in isometric projection of the gyroscopic apparatus.

In Figure 1 of the drawings the gyroscopic apparatus is shown mounted on a base plate 1 which is fixed by means of feet 2, 3 and 4 to the aircraft or missile that the apparatus is intended to control. The control system of the craft or missile is arranged so that the base plate 1 is continually maintained in a predetermined relationship with the rotor case, signals being provided measuring any departure from this predetermined relationship and the control surfaces of the craft being deflected in dependence on those signals to reduce them to zero.

Figure 2:
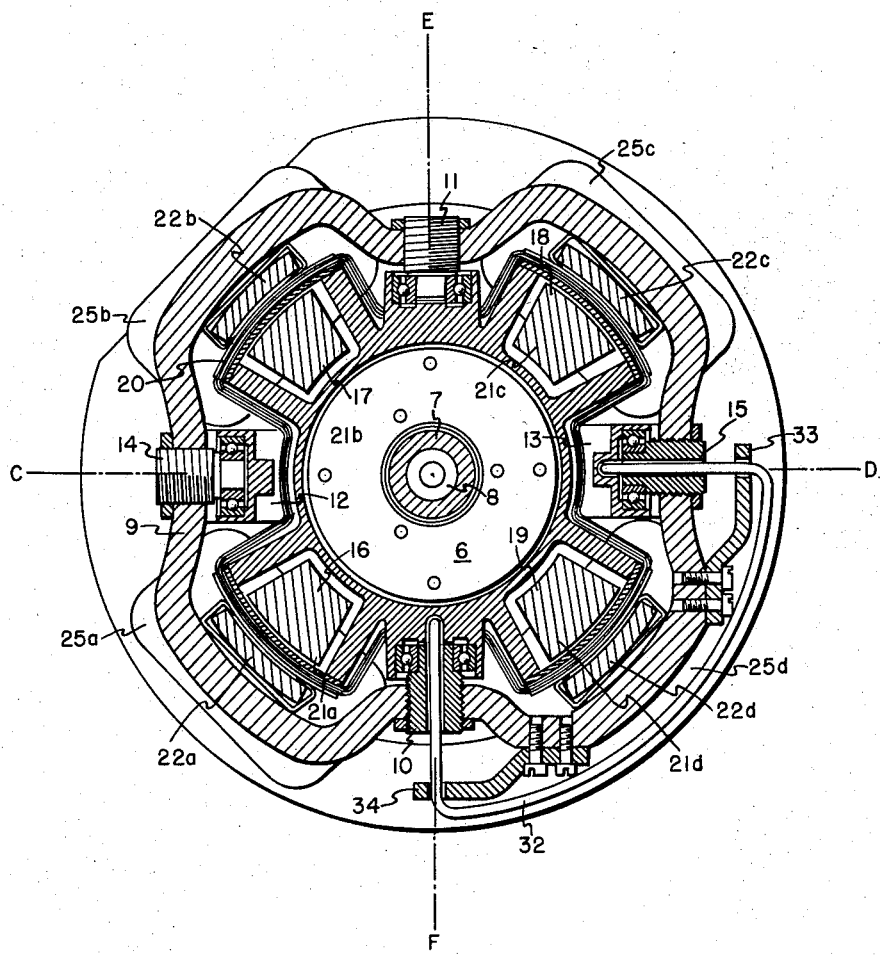
Figure 2 shows a section through the gimbal ring of the gyroscopic apparatus shown in Figure 1
Figure 3:
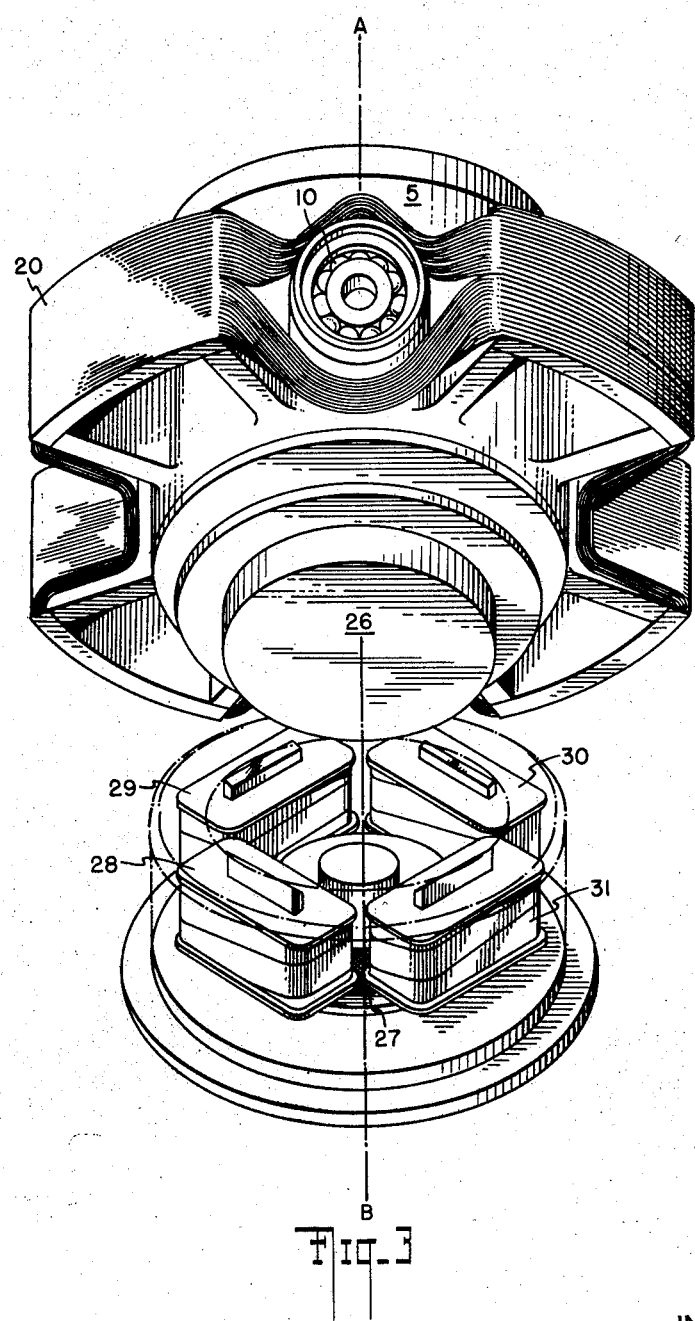
Fig. 3 shows an exploded view in isometric projection of the rotor case and pick-off of the gyroscopic apparatus shown in Figure 1.

The rotor case 5 contains a rotor 6 mounted for spinning about the spin axis A—B (Fig. 3). The rotor is driven by an electric motor comprising a stator winding 7 (Figure 2) mounted on a pillar 8 fixed on the centre of the rotor case and a squirrel-cage winding (not shown) fixed to the rotor 6. The rotor case is supported in a gimbal ring 9 by means of bearings 10 and 11. These bearings are conventional ball bearings as shown more particularly in Fig. 3. The gimbal ring 9 is itself carried on pillars 12 and 13 secured to the base plate 1 by means of ball bearings 14 and 15. The rotor case 5 is thus mounted with freedom to rotate with respect to the base plate 1 about axes C—D and E—F.

To enable the rotor case to be precessed, torque motors 16, 17, 18, and 19 are provided. Each torque motor is so located and constructed that when energised it applies a torque to the rotor case from the base plate about an axis whose direction lies in the plane of the gimbal axes C—D and E—F and displaced at an angle of 45° to each of them. Each torque motor comprises an energisable electromagnet fixed to the base plate co-operating with a portion of a continuously energised coil fixed to the rotor case. It will be observed that the rotor case is distorted from the form of a circle in the equatorial plane being bowed outwards in four positions between the gimbal axes so as to form a four-armed star somewhat similar to a Maltese cross. A coil 20 is wound round the rotor case following the contours of the four-armed star and arranged as shown in Fig. 3 to clear the bearings. The portions of this coil that are on the projecting area of the star are those that cooperate with the electromagnets to form the torque motors. The bowed portions of the single coil 20 extend outwardly from the case 5 in oppositely disposed positions to thread the air gaps in the respective electromagnets. Each electromagnet comprises two arms 21a, 21b etc. and 22a, 22b etc. extending in a direction normal to the plane of the coil 20 so as to form two pole pieces facing each other on opposite sides of a bowed-out portion of the coil. The pole pieces are part spherical as also are the portions of the coils lying in the air gap between them. The two arms of each electromagnet are joined by a yoke 23a, 23b, 23c etc. secured to the arms by screws. On each of the arms 22a, 22b etc. two bobbins 24a, 24b etc. and 25a, 25b etc. are provided and on these bobbins coils are wound. Energisation of these coils provides a force from the base plate 1 to the rotor case 5 in the direction of the arms of the electromagnets.

On the base of the rotor case 5 there is a part spherical projection 26 of magnetisable material. This projection co-operates with five coils 27, 28, 29, 30 and 31 wound on a five-pole core as shown in Fig. 3. The coil 27 on the central pole of the core is energised with alternating current and opposite pairs of coils are connected differentially so that the voltages induced in them provide a measure of the position of the rotor case 5 relative to the core. The coils and the core are embedded in a plastic material such as that sold under the trade name "Araldite." In view of the high frequency of the energising current, the five-pole core is constructed from laminations.

The energising currents for the stator winding 7 of the driving motor and for the winding 20 are passed from the base plate by means of a cable 32 that passes through the centre of the bearings 15 and 10. To reduce as far as possible the torque exerted between the base plate and the gimbal ring and between the gimbal ring and the rotor case by this cable, the portions that are subject to twist on the occurrence of relative rotation between these parts are extended by means of arms 33 and 34 secured to the gimbal ring 9 by means of screws.

In a complete system for the control of the direction of flight of a craft, the signals from the pick-off coils 28, 29, 30 and 31 are utilised to operate the control surfaces of the craft to reduce these signals towards zero. As a result of this arrangement the direction of flight of the craft tends to remain constant to the extent that the direction in space of the spin axis A—B remains constant. To effect changes in the direction of flight of the craft, torques are applied to the rotor case 5 to produce precession of the spin axis A—B. The control system operates to change the direction of flight of the craft so that it corresponds to the changing direction of the spin axis A—B.

Since many changes could be made in the above construction and many apparently widely different embodiments of this invention could be made without departing from the scope thereof, it is intended that matter contained in the above description or shown in the accompanying drawings shall be interpreted as illustrative and not in a limiting sense.

What is claimed is:

1. The combination in a gyroscopic apparatus with a gyroscopic rotor mounted to spin about a spin axis in a rotor case supported with freedom about a first axis perpendicular to the rotor spin axis in a gimbal frame mounted on a support with freedom about a second axis perpendicular to the first axis and normally perpendicular to the spin axis; electromotive torque producing means between the support and rotor case including a plurality of equiangularly disposed electromagnets fixedly connected to the support having air gaps across which flux passes in a radial direction in the plane of the gimbal frame axes displaced at an angle to each of the gimbal frame axes, and a single energized coil fixedly connected to the rotor case bowed outwardly therefrom in oppositely disposed positions to thread the air gaps in the respective electromagnets.

2. Apparatus of the character claimed in claim 1, in which the gaps of the electromagnets of the electromotive torque producing means are displaced at an angle of 45° to each of the first and second gimbal frame axes.

3. Apparatus of the character claimed in claim 1, in which the electromotive torque producing means includes four equiangularly disposed and oppositely paired electromagnets that are arranged in mutually perpendicular relation with the air gaps thereof displaced at an angle of 45° to each of the first and second gimbal frame axes.

4. Apparatus of the character claimed in claim 1, in which the electromotive torque producing means includes four equiangularly disposed and oppositely paired electromagnets having air gaps across which flux passes in a generally radial direction in the plane of the gimbal frame axes, and said single coil is bowed outwardly with respect to the case in the shape of a four armed star similar to a Maltese cross to thread the air gaps in the respective electromagnets at an angle of 45° to each of the first and second gimbal frame axes.

5. In gyroscopic apparatus with a rotor case supported with freedom about two mutually perpendicular axes; electromotive torque producing means including an energized coil lying generally in the plane defined by the axes of the case fixedly connected to the case and having four bowed portions extending outwardly with respect to the case in the form of a Maltese cross, said bowed portions being displaced at an angle of 45° with respect to the axes of freedom of the case.

6. In gyroscopic apparatus with a rotor case, a support, a gimbal frame connecting the case and support mounting the case with freedom about two mutually perpendicular axes; electromotive torque producing means including four electromagnets fixed to the support having air gaps across which flux passes in a radial direction in the plane of the gimbal frame axes, said electromagnets being equiangularly disposed in oppositely arranged pairs with the air gaps thereof displaced at an angle of 45° with respect to the axes of freedom of the case.

References Cited in the file of this patent

UNITED STATES PATENTS

| | | |
|---|---|---|
| 1,939,825 | Narvesen et al. | Dec. 19, 1933 |
| 2,486,578 | Summers | Nov. 1, 1949 |
| 2,600,476 | Bursack | June 17, 1952 |
| 2,676,491 | Johnson | Apr. 27, 1954 |
| 2,682,773 | Ward | July 6, 1954 |